(12) United States Patent
Witt

(10) Patent No.: US 11,565,788 B2
(45) Date of Patent: Jan. 31, 2023

(54) PIVOTING SAIL FAIRING SYSTEM AND ROTARY WING AIRCRAFT INCLUDING THE SAME

(71) Applicant: LOCKHEED MARTIN CORPORATION, Bethesda, MD (US)

(72) Inventor: Jonathan Witt, Fort Worth, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 293 days.

(21) Appl. No.: 16/809,936

(22) Filed: Mar. 5, 2020

(65) Prior Publication Data
US 2021/0276690 A1 Sep. 9, 2021

(51) Int. Cl.
*B64C 7/00* (2006.01)
*B64C 27/10* (2006.01)

(52) U.S. Cl.
CPC ............... *B64C 7/00* (2013.01); *B64C 27/10* (2013.01)

(58) Field of Classification Search
CPC .......... B64C 7/00; B64C 27/10; B64C 11/48; B64C 27/12

USPC ...................................................... 244/17.23
See application file for complete search history.

(56) References Cited

U.S. PATENT DOCUMENTS

| | | | |
|---|---|---|---|
| 3,101,920 A | 8/1963 | Fradenburgh | |
| 3,130,942 A | 4/1964 | Fradenburg | |
| 9,914,525 B2 | 3/2018 | Alfano | |
| 2007/0181741 A1* | 8/2007 | Darrow | B64C 27/14 244/17.23 |
| 2008/0112808 A1* | 5/2008 | Schmaling | B64C 27/10 416/174 |
| 2009/0220341 A1* | 9/2009 | Schmaling | B64C 27/48 416/114 |
| 2017/0021912 A1* | 1/2017 | Cox | B64C 7/00 |
| 2017/0210463 A1* | 7/2017 | Koessick | B64C 27/001 |
| 2017/0297686 A1* | 10/2017 | Hunter | B64C 27/12 |
| 2018/0281932 A1* | 10/2018 | Wake | B64C 27/10 |

* cited by examiner

*Primary Examiner* — Brady W Frazier
(74) *Attorney, Agent, or Firm* — Foley & Lardner LLP

(57) ABSTRACT

According to an aspect, a pivoting sail fairing system includes a rotatable fairing, for rotation about a first axis of rotation of an aircraft, that includes a housing that defines a compartment arranged inward from the housing, the housing including a first orifice on a first surface and a second orifice on a second surface of the housing, and a first actuator mounted on a surface of the compartment inward from the housing.

18 Claims, 9 Drawing Sheets

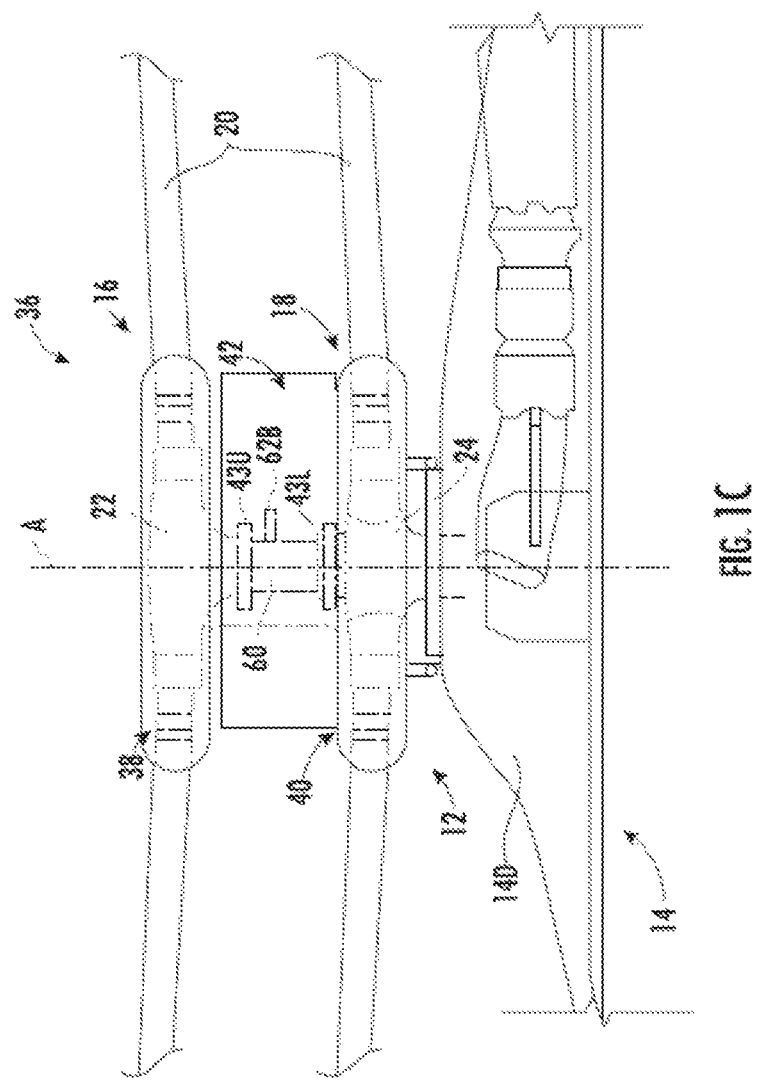

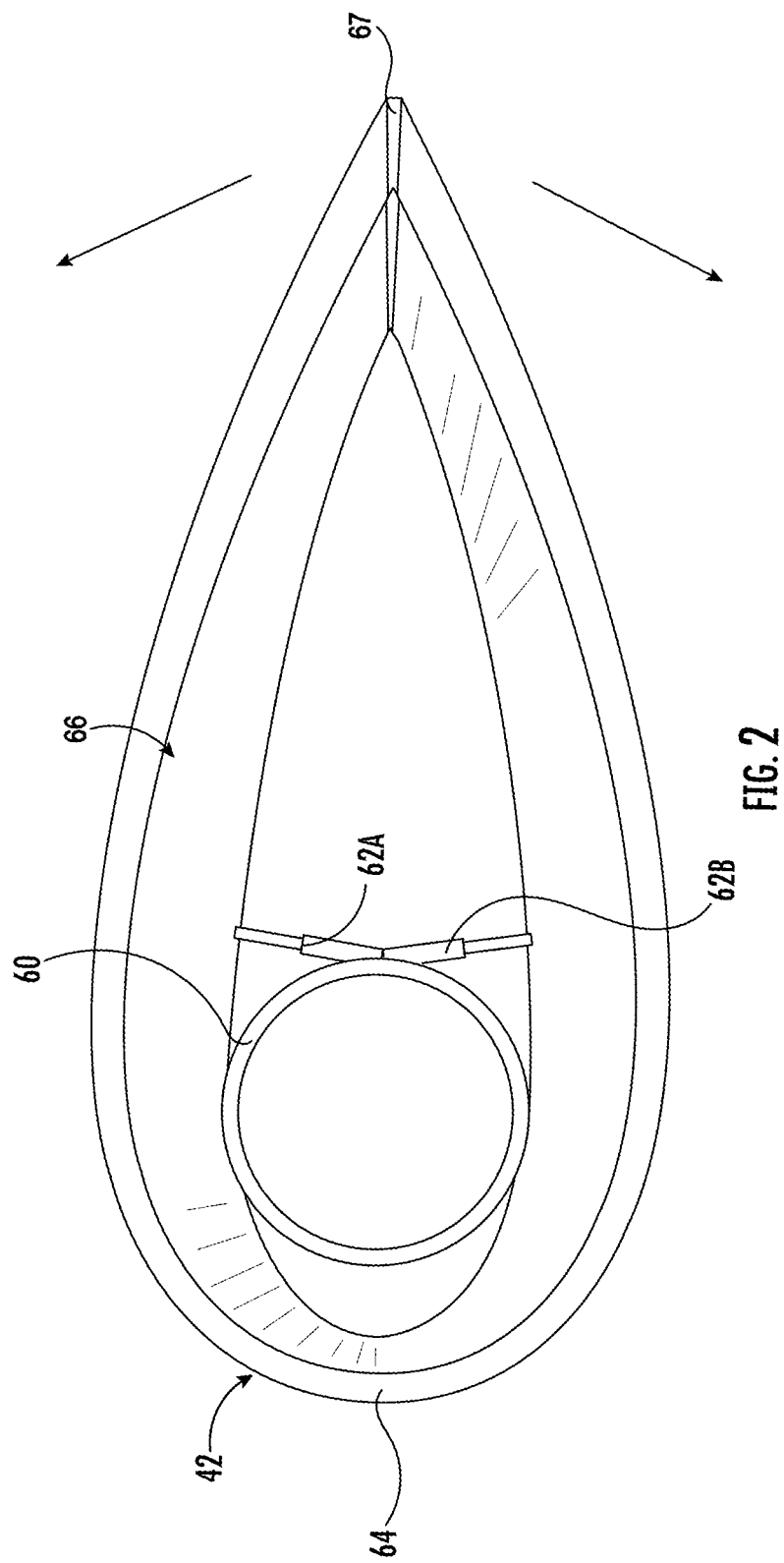

PIVOTING SAIL FAIRING SYSTEM AND ROTARY WING AIRCRAFT INCLUDING THE SAME

STATEMENT OF FEDERAL SUPPORT

This invention was made with government support under W911W6-19-9-0005 awarded by the Army. The government has certain rights in the invention.

BACKGROUND

Exemplary embodiments relate to a fairing of aircraft, and more particularly, relates to a pivotable sail fairing.

The aerodynamic drag associated with a rotor system of a rotary wing aircraft is a significant portion of the overall aircraft drag. The rotor system drag increases for a rotary wing aircraft having a counter-rotating, coaxial rotor system primarily due to the additional rotor hub and the interconnecting main rotor shaft assembly between the upper and lower rotor systems. The aerodynamic drag of the dual counter-rotating, coaxial rotor system is generated by three main components: the upper hub, the lower hub, and the interconnecting main rotor shaft assembly.

BRIEF DESCRIPTION

According to one embodiment, a pivoting sail fairing system includes a rotatable fairing, for rotation about a first axis of rotation of an aircraft, that includes a housing that defines a compartment arranged inward from the housing, the housing including a first orifice on a first surface and a second orifice on a second surface of the housing. The system further includes a first actuator mounted on a surface of the compartment inward from the housing.

In addition to one or more of the features described above or below, or as an alternative, the first actuator is a spring-based actuator.

In addition to one or more of the features described above or below, or as an alternative, wherein the first actuator is an electronically controlled actuator.

In addition to one or more of the features described above or below, or as an alternative, the system further includes a sensor arranged on an airframe of the aircraft, where an angle of rotation of the fairing is based in part on readings from the sensor.

In addition to one or more of the features described above or below, or as an alternative, the rotatable fairing has an airfoil contour.

In addition to one or more of the features described above or below, or as an alternative, the system further includes a second actuator.

In addition to one or more of the features described above or below, or as an alternative, the first actuator and the second actuator are a same type of actuator.

In addition to one or more of the features described above or below, or as an alternative, the first actuator is a different type of actuator than the second actuator.

In addition to one or more of the features described above or below, or as an alternative, the first actuator is a spring-based actuator and the second actuator is a piston-based actuator.

According to another embodiment, a rotary wing aircraft includes a rotor shaft, a rotatable fairing connected to the rotor shaft for rotation about a first axis of rotation, a first actuator mounted to the rotor shaft and in operable communication with the fairing, where the first actuator adjusts an angle of rotation of the fairing about the first axis of rotation.

In addition to one or more of the features described above or below, or as an alternative, a leading edge of the rotatable fairing is arranged relative to the rotor shaft.

In addition to one or more of the features described above or below, or as an alternative, the rotatable fairing is connected to the standpipe between a first rotor system and a second rotor system.

In addition to one or more of the features described above or below, or as an alternative, the first rotor system comprises a first hub fairing, and the second rotor system comprises a second hub fairing.

In addition to one or more of the features described above or below, or as an alternative, the first actuator is operable to resist a rotation, caused by an external force, of the fairing up to a threshold amount of the external force.

In addition to one or more of the features described above or below, or as an alternative, the aircraft has a dual, counter-rotating, coaxial rotor system.

In addition to one or more of the features described above or below, or as an alternative, the fairing is connected to the rotor shaft via a standpipe.

In addition to one or more of the features described above or below, or as an alternative, wherein the first actuator is attached to the standpipe.

In addition to one or more of the features described above or below, or as an alternative, the fairing is connected to the standpipe via a first bearing and a second bearing.

In addition to one or more of the features described above or below, or as an alternative, the aircraft further includes a second actuator, where the first and second actuators are connected to the rotor shaft via a standpipe.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The following descriptions should not be considered limiting in any way. With reference to the accompanying drawings, like elements are numbered alike:

FIG. 1C depicts a dual axial rotor system in accordance with an exemplary embodiment;

FIG. 2 depicts a cross-sectional plan view of a pivotable fairing in accordance with an exemplary embodiment;

DETAILED DESCRIPTION

A detailed description of one or more embodiments of the disclosed apparatuses is presented herein by way of exemplification and not limitation with reference to the Figures.

The main rotor system of a vertical takeoff and landing (VTOL) rotary wing aircraft produces a significant amount of the aircraft drag. In response, engineers add fairings to reduce the drag impact. Fairings include hub fairings, shaft fairings, and sail fairings. A sail fairing is the fairing between the upper and lower rotor systems of a dual, counter-rotating, coaxial rotor system. The sail fairing decreases the drag of the hub shaft. However, due to the static design of the sail fairing, it reduces drag only when the aircraft is moving in the forward direction, or if the relative wind is head-on. If, however, the relative airflow to the aircraft is at some other angle than 0 degrees, the drag due to the sail fairing significantly increases.

One or more embodiments of the present invention address one or more of the above-described shortcomings of the prior art by providing a pivotable sail fairing that is able to pivot around a hub shaft to increase the range of its effectiveness. The pivotable sail fairing is in operable communication with a standpipe via an upper bearing and a lower bearing. Two actuators are attached to the sail fairing and the standpipe to provide resistance, decrease flutter, and allow for movement. The actuators keep the fairing pointed straight until enough side load is achieved to compress the spring and pivot the sail fairing.

Figure 1A:
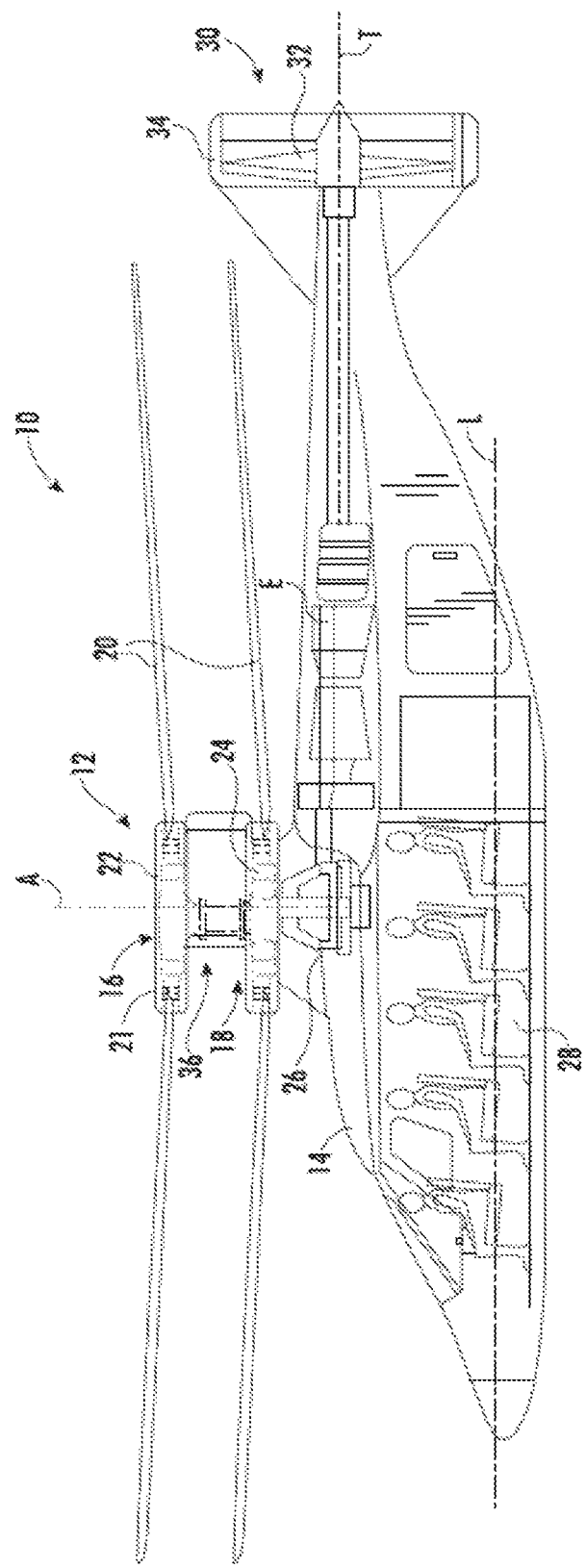
FIG. 1A depicts a rotary wing aircraft in accordance with an exemplary embodiment.
Figure 1B:
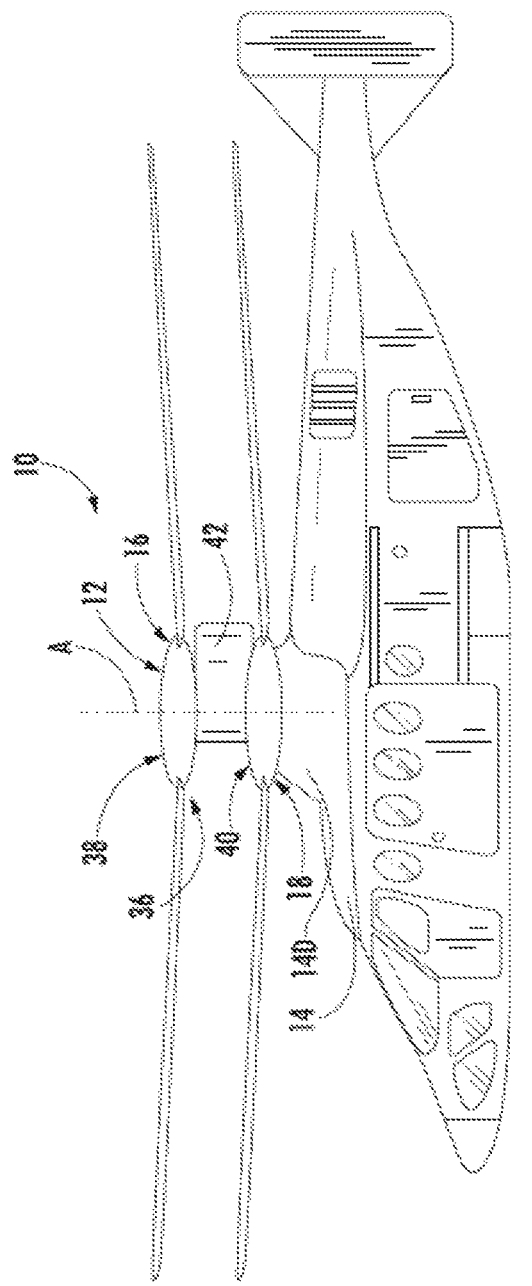
FIG. 1B depicts a rotary wing aircraft in accordance with an exemplary embodiment.

FIGS. 1A and 1B illustrate an exemplary VTOL rotary wing aircraft 10 having a dual, counter-rotating, coaxial rotor system 12. The aircraft 10 includes an airframe 14, which supports the dual, counter rotating, coaxial rotor system 12, as well as a translational thrust system 30, which provides translational thrust generally parallel to an aircraft longitudinal axis L. Although a particular aircraft configuration is illustrated in the disclosed embodiment, other VTOL aircraft may also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 extend outward from the rotor hubs 22, 24 and are connected thereto in any manner known to one of ordinary skill in the art (schematically illustrated at 21). Any number of blades 20 may be used with the rotor system 12.

A main gearbox 26, which may be located above the aircraft cabin 28, drives the rotor system 12. The optional translational thrust system 30 may be driven by the same main gearbox 26, which drives the rotor system 12. The main gearbox 26 is driven by one or more engines (illustrated schematically at E) and may be interposed between the gas turbine engines E, the rotor system 12, and the translational thrust system 30.

The translational thrust system 30 may be mounted to the rear of the airframe 14 with a rotational axis T oriented substantially horizontal and parallel to the aircraft longitudinal axis L to provide thrust for high-speed flight. Preferably, the translational thrust system 30 includes a pusher propeller 32 mounted within an aerodynamic cowling 34.

As shown, the rotor system 12 preferably also includes a pivoting sail fairing system 36 generally located between and around the upper and lower rotor systems 16, 18 such that the rotor hubs 22, 24 are at least partially contained therein. It is known that a significant portion of the overall aircraft drag on a VTOL aircraft is due to the main rotor system. The rotor system drag increases for a rotary wing aircraft having a counter-rotating, coaxial rotor system primarily due to the additional rotor hub and the interconnecting main rotor shaft assembly between the upper and lower rotor systems. In accordance with the principles of the present invention, the pivoting sail fairing system 36 preferably includes an upper hub fairing 38, a lower hub fairing 40, and a pivoting sail fairing 42 therebetween. Preferably, the pivoting sail fairing system 36 is sized and configured to reduce interference effects between the separate fairing components 38, 40, 42, and to minimize flow separation in the junction areas. Furthermore, the lower hub fairing 40 is preferably sized and configured to follow the contours of the airframe 14 in an area typically referred to on a rotorcraft as a pylon 14D.

Referring to FIGS. 1A, 1B, 1C, and 2, the upper rotor system 16 is driven by an upper rotor shaft (not shown) axially supported at the main gearbox 26. Similarly, the lower rotor system 18 is connected to and driven by a lower rotor shaft (not shown), which is coaxial with the upper rotor shaft and located radially outboard of the upper rotor shaft. A stationary standpipe 60 is coaxial with the upper rotor shaft and the lower rotor shaft and is located radially between the upper rotor shaft and the lower rotor shaft. The standpipe 60 is fixed to a non-rotating part of the gearbox 26, for example, a gearbox housing, via, in some embodiments, a spline connection. The standpipe 60 extends along the main rotor axis, terminating between the upper rotor system 16 and the lower rotor system 18.

The pivoting sail fairing system 36 preferably further reduces drag by employing a structure that accounts for interference effects by optimizing the surface profile of the fairing. Detailed surface modifications of intersecting surfaces, including fillets and modified interface shapes, may be utilized to optimize drag reduction.

Referring to FIG. 1C, the pivoting sail fairing 42 is preferably attached to the standpipe 60 through an upper bearing 43U and a lower bearing 43L. The upper bearing 43U and the lower bearing 43L are respectively located adjacent an upper portion and a lower portion of the pivoting sail fairing 42. The upper bearing 43U and the lower bearing 43L are further respectively attached to an upper portion and a lower portion of the standpipe 60. It should be appreciated that other mechanisms for attaching the pivoting sail fairing 42 to the standpipe 60 may be used. The actuator 62B is mounted to the standpipe 60 and connected to an inner surface of the pivoting sail fairing 42.

Referring now to FIG. 2, a cross-sectional plan view of the standpipe 60 and pivoting sail fairing 42 is shown. The pivoting sail fairing 42 includes a housing 64 defining a compartment 66. The housing 64 further includes two orifices (not shown) on a top surface 72 and a bottom surface 74 of the housing 64, which provide access to the compartment 66. The standpipe 60 provides a non-rotating structure at which to mount a pivoting sail fairing 42 between the upper rotor system 16 and the lower rotor system 18. The housing 64 may be arranged relative to the standpipe 60, such that the standpipe 60 extends through the first orifice and the second orifice. In some embodiments, the pivoting sail fairing 42 has an airfoil-shaped contour, and the standpipe 60 is arranged relative to the leading edge 64 of the airfoil. Additionally, the trailing edge 67 is positioned in a direction of a tail rotor or the pusher propeller 32. Generally, the standpipe has a tubular shape and provides a mount for the upper bearing 43U, a lower bearing 43L, and an actuator 62B. The pivoting sail fairing 42 illustrated in FIG. 2 is in a resting state. In other words, the pivoting sail fairing 42 is a linear position in relation to the airframe 14.

The standpipe 60 provides a structure at which to mount an actuator 62B. The actuator 62B can be, for example, a spring, a gas spring, a pulley and electric motor, a hydraulic spring, or any other appropriate actuator that provides a resistive force to an external force. In some embodiments, the actuator 62B is controlled by a computing device (not shown) that operable to provide directional control to the pivoting sail fairing 42. For example, the controller may direct the pivotable sail fairing 62B to move in a predetermining direction for a predetermined number of degrees in response to an oncoming wind. In instances in which the system includes more than one actuator, the actuators can be the same type of actuator, for example, spring-based actuators. In other instances, the actuators can be different actuators, for example, at least one spring-based actuator and at least one piston-based actuator.

The actuator 62B is mounted to the standpipe 60 and in operable communication with the pivoting sail fairing 42. The actuator 62B provides a resistive force to hinder the pivoting sail fairing 42 from fluttering or rotating about the standpipe 60 due to an external force/side load. The actuator 62B is configured to exert a resistive force on the pivoting sail fairing 42 to counter any side load being applied to the pivoting sail fairing 42. The actuators 62B are configured to cause the pivoting sail fairing 42 to maintain a resting position until such time that a threshold force is applied to the pivoting sail fairing 42. In the instance, that a threshold level of force is applied to the pivoting sail fairing 42, the actuators 62B further permit the pivoting sail fairing to partially rotate about rotor axis of rotation A. For example, if a side wind applies enough force to the pivoting sail fairing 42, the actuator 62B permits partial rotation of the pivoting sail fairing 42 in the direction of the wind. The amount of permissible rotation is based on a rotation angle of the pivoting sail fairing that optimizes aerodynamic drag reduction in the presence of an external force or crosswind.

Figure 3:
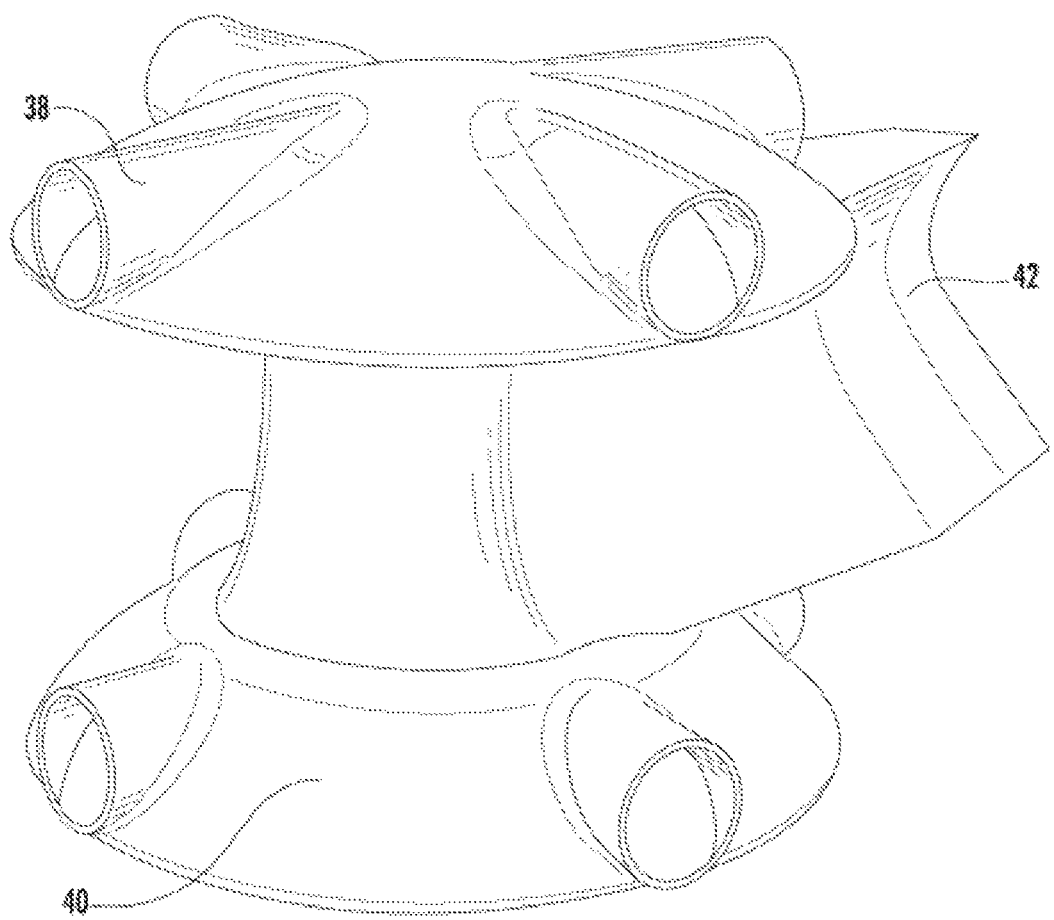
FIG. 3 depicts a pivotable fairing in accordance with an exemplary embodiment.

Referring to FIG. 3, an embodiment of the pivoting sail fairing 42 is shown. The pivoting sail fairing 42 is arranged between the upper hub fairing 38 and the lower hub fairing 40. As illustrated in FIG. 3, the trailing edge of the pivoting sail fairing 42 extends beyond the circumference of the upper hub fairing 38 and the lower hub fairing 40.

Figure 4:
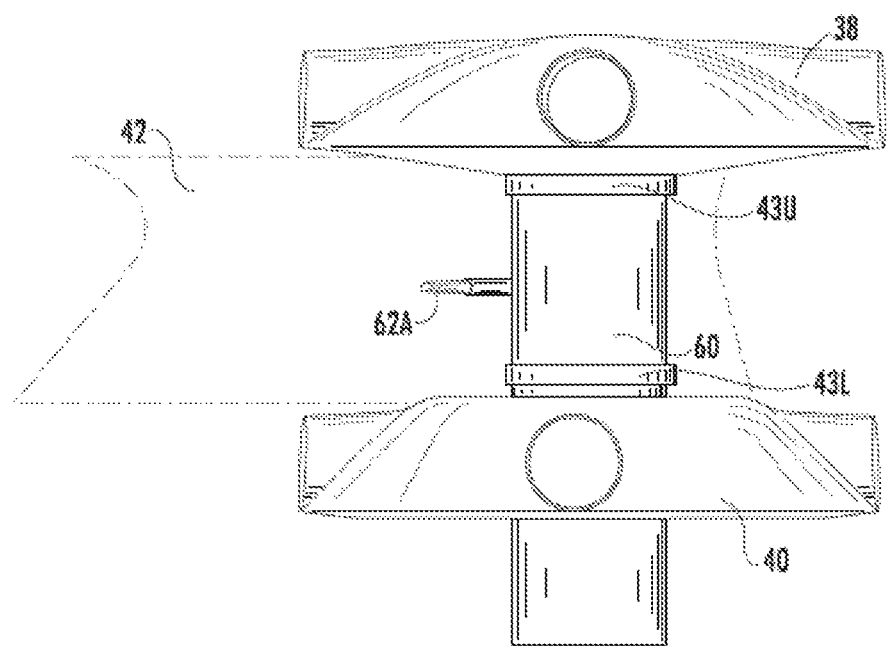
FIG. 4 depicts a pivotable fairing in accordance with an exemplary embodiment.

Referring to FIG. 4, an embodiment of the pivoting sail fairing 42 is shown. The pivoting sail fairing 42 is arranged between the upper hub fairing 38 and the lower hub fairing 40. As illustrated in FIG. 4, The pivoting sail fairing 42 is connected to the standpipe 60 via an upper bearing 43U and a lower bearing 43L.

Figure 5:
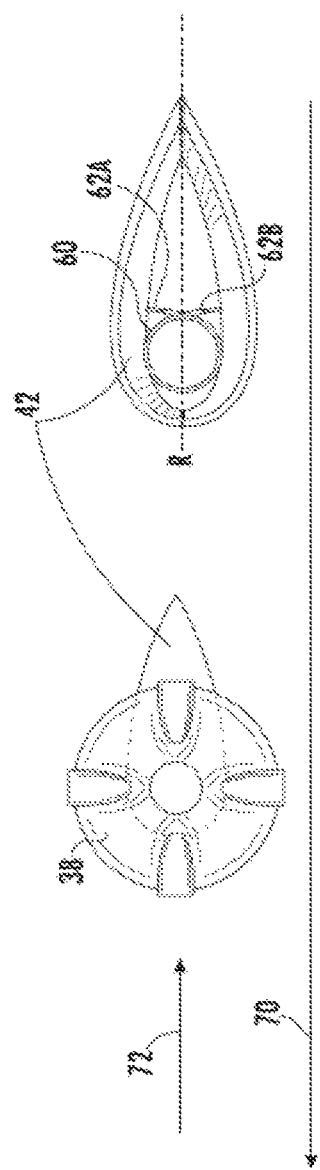
FIG. 5 illustrates a pivotable fairing in a resting position in accordance with an exemplary embodiment.

Referring to FIG. 5, an illustration of the pivoting sail fairing in a resting position is shown. As illustrated, the aircraft 10 is moving in a forward direction, and the leading edge 64 and the trailing edge 67 of the pivoting sail fairing are linearly aligned with aircraft direction 76 and the airflow direction 78. As further illustrated, the airflow is moving in the opposite direction of the aircraft 10. In this instance, the pivoting sail fairing 42 remains in a resting position R.

Figure 6:
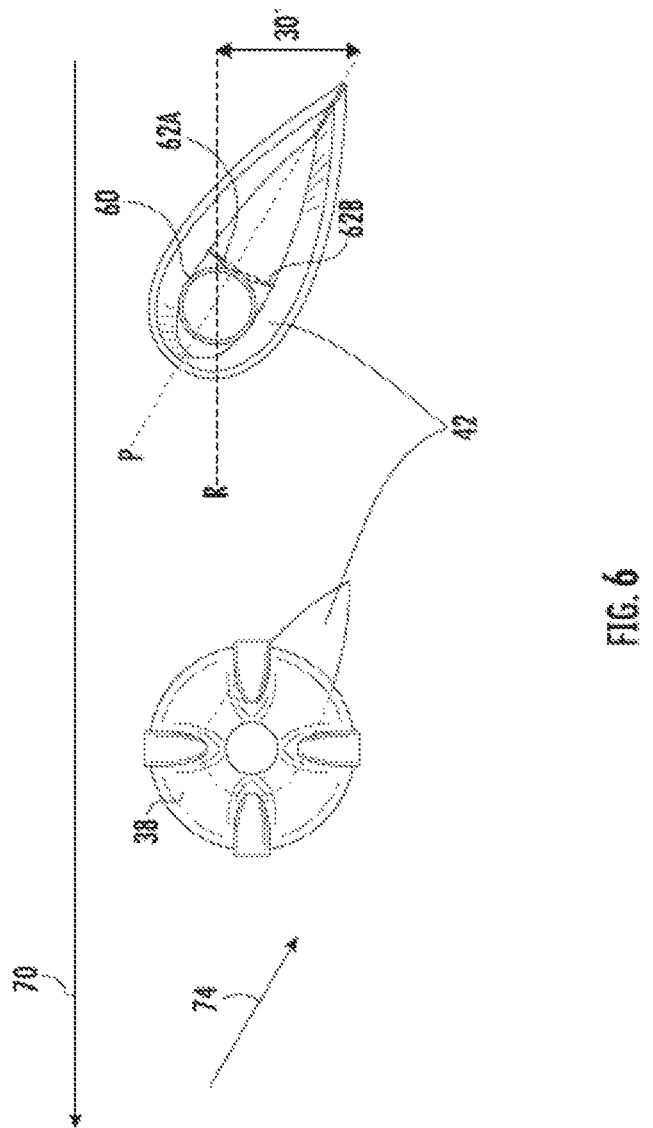
FIG. 6 illustrates a pivotable fairing in a rotated position in accordance with an exemplary embodiment.

The position of the pivoting sail fairing 42 in FIG. 5 is in contrast with the position of the pivoting sail fairing in FIG. 6. As seen in FIG. 6, the aircraft direction 76 remains in a forward direction. However, the airflow direction 92 is at an angle to the aircraft direction 76. The force caused by the airflow causes the actuators 62A, 62B to permit the pivoting sail fairing 42 to partially rotate such the pivoting sail fairing 42 is substantially linear with the direction of the airflow. In this instance, the pivoting sail fairing 42 is at a rotated position P, which is 30 degrees from the resting position R. In this instance, the airflow/crosswind direction 92 has shifted 30 degrees from the original airflow direction 78. The rotation angle of the pivoting sail fairing 42 is not necessarily the same angle of airflow direction. The actuators 62A, 62B can be configured to restrict the rotation to a maximum angle. For example, in another instance, even if the airflow direction had shifted 50 degrees from original airflow direction 78, the pivoting sail fairing 42 is restricted from rotating no more than 30 degrees in either direction from the resting position R.

Referring to FIG. 6, an illustration of the actuators 62A 62B in response to an external force is provided. A first actuator 62A has shifted from a resting position to a retracted position. Additionally, a second actuator 62B has shifted from a resting position to an extended position. In embodiments, in which the actuators are spring-based, the force of the airflow against the pivoting sail fairing causes the actuators to restrict or extend. The actuators 62A, 62B are configured to remain in a resting state in the absence of a force greater than a threshold amount. For example, as the external force is reduced below the threshold amount, the stiffness of the actuator spring will cause the spring to revert back to the resting state length.

Figure 7:
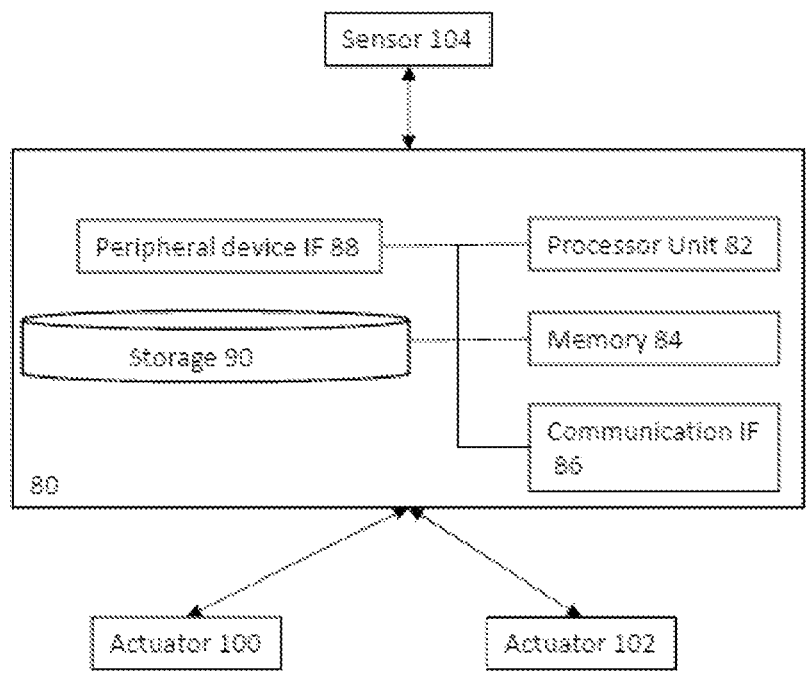
FIG. 7 illustrates a control system coupled to an actuator in accordance with an exemplary embodiment.

Referring to FIG. 7, an onboard computer-based system 80 for controlling two actuators 100, 102 is shown. In some embodiments, the actuators 100, 102 motions are controlled by the computer-based system 80. The computer-based system 80 includes, a processor unit 82, memory 84, communication interface 86, peripheral device interface 88, and a storage 90.

The memory 84 may be or include a device such as a Dynamic Random Access Memory (D-RAM), Static RAM (S-RAM), other RAM, or a flash memory. The storage 90 may be or include a hard disk, a magneto-optical medium, an optical medium, or other type of device for electronic data storage. The communication interface 86 may be, for example, a communications port, a wired transceiver, a wireless transceiver, and/or a network card. The peripheral device interface 88 may be an interface configured to communicate with one or more peripheral devices, including one or more sensors 104.

The processor unit 82 is in operable communication with the one or more sensors 104 arranged on the airframe 14 and further in communication with external weather tracking systems. The one or more sensors 104 monitor airflow patterns and sense changes in the ambient environment, including air pressure, temperature, and wind direction. The computer-based system 80, uses data collected from the one or sensors 104 to cause the pivoting sail fairing 42 to rotate. For example, based on sensor data readings, the processor unit 82 may cause actuators 100, 102 to rotate the pivoting sail fairing 42 in response to a crosswind or the reduction of an aerodynamic drag.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fairing system, the system comprising:
a rotatable fairing, for rotation about a first axis of rotation of an aircraft, comprising a housing that defines a compartment arranged inward from the housing, the housing comprising a first orifice on a first surface and a second orifice on a second surface of the housing; and
a first actuator connected to an inner surface of the rotatable fairing, the first actuator extending in a direction substantially perpendicular to the first axis of rotation and being configured to, in response to input from a controller coupled to the first actuator, direct the rotatable fairing to rotate a predetermined amount of rotation responsive to an oncoming wind.

2. The system of claim 1, wherein the first actuator is an electronically controlled actuator.

3. The system of claim 2, further comprising a sensor arranged on an airframe of the aircraft, wherein an angle of rotation of the fairing is based in part on data collected by the sensor.

4. The system of claim 1, wherein the rotatable fairing has an airfoil contour.

5. The system of claim 1, further comprising a second actuator.

6. The system of claim 5, wherein the first actuator and the second actuator are a same type of actuator.

7. The system of claim 5, wherein the first actuator is a different type of actuator than the second actuator.

8. The system of claim 7, wherein the second actuator is a piston-based actuator.

9. A rotary wing aircraft comprising:
a stationary standpipe;
upper and lower rotor systems which rotate relative to the stationary standpipe about a first axis of rotation;
a rotatable fairing connected to the stationary standpipe about the first axis of rotation; and
a first actuator mounted to the stationary standpipe and connected to an inner surface of the fairing,
wherein the first actuator is operable to adjust an angle of rotation of the fairing about the first axis of rotation; and
wherein the rotatable fairing comprises an upper bearing disposed at an uppermost portion of the rotatable fairing and a lower bearing disposed at a lowermost portion of the rotatable fairing, and wherein the standpipe is coupled to the upper bearing and the lower bearing.

10. The rotary wing aircraft of claim 9, wherein a leading edge of the rotatable fairing is arranged relative to the standpipe.

11. The rotary wing aircraft of claim 9, wherein the rotatable fairing is connected to the standpipe between the upper rotor system and the lower rotor system.

12. The rotary wing aircraft of claim 11, wherein the upper rotor system comprises a first hub fairing, and the lower rotor system comprises a second hub fairing.

13. The rotary wing aircraft of claim 9, wherein the first actuator is operable to resist a rotation, caused by an external force, of the fairing up to a threshold amount of the external force.

14. The rotary wing aircraft of claim 9, wherein the first actuator is operable to return to a resting position in response to an external force being below a threshold amount.

15. The rotary wing aircraft of claim 9, wherein the rotary wing aircraft has a dual, counter-rotating, coaxial rotor system.

16. The rotary wing aircraft of claim 9, wherein the first actuator is connected to an inner surface of the rotatable fairing, the first actuator extending in a direction substantially perpendicular to the first axis of rotation.

17. The rotary wing aircraft of claim 16, wherein the first actuator is attached to the standpipe.

18. The rotary wing aircraft of claim 9, further comprising a second actuator, wherein the first and second actuators are connected to the rotatable fairing and the standpipe.

* * * * *